I. R. UTTERBACK, W. L. GALBRAITH & H. G. SMITH.
CATTLE GUARD.
APPLICATION FILED APR. 11, 1911.
1,008,757.
Patented Nov. 14, 1911.
3 SHEETS—SHEET 1.
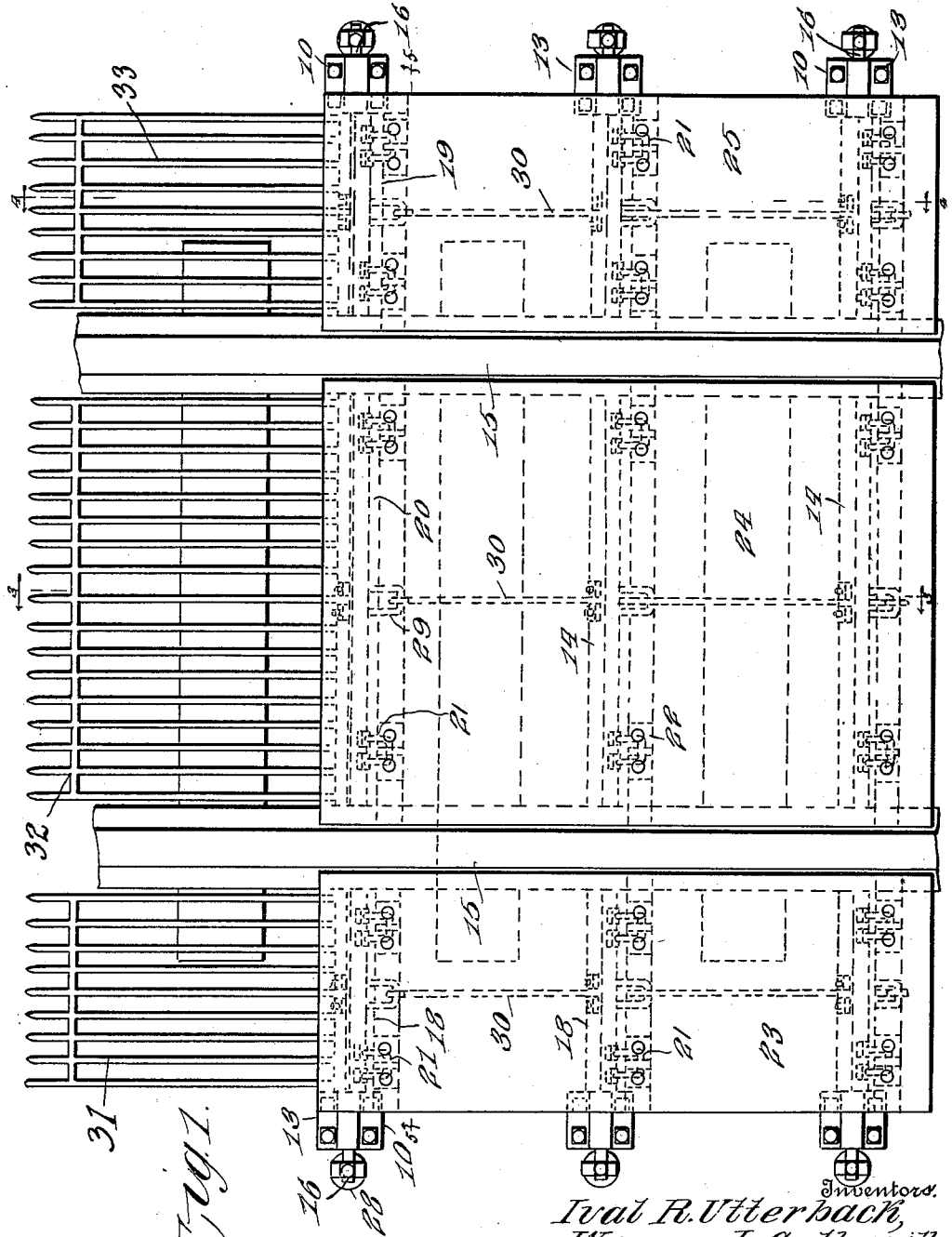

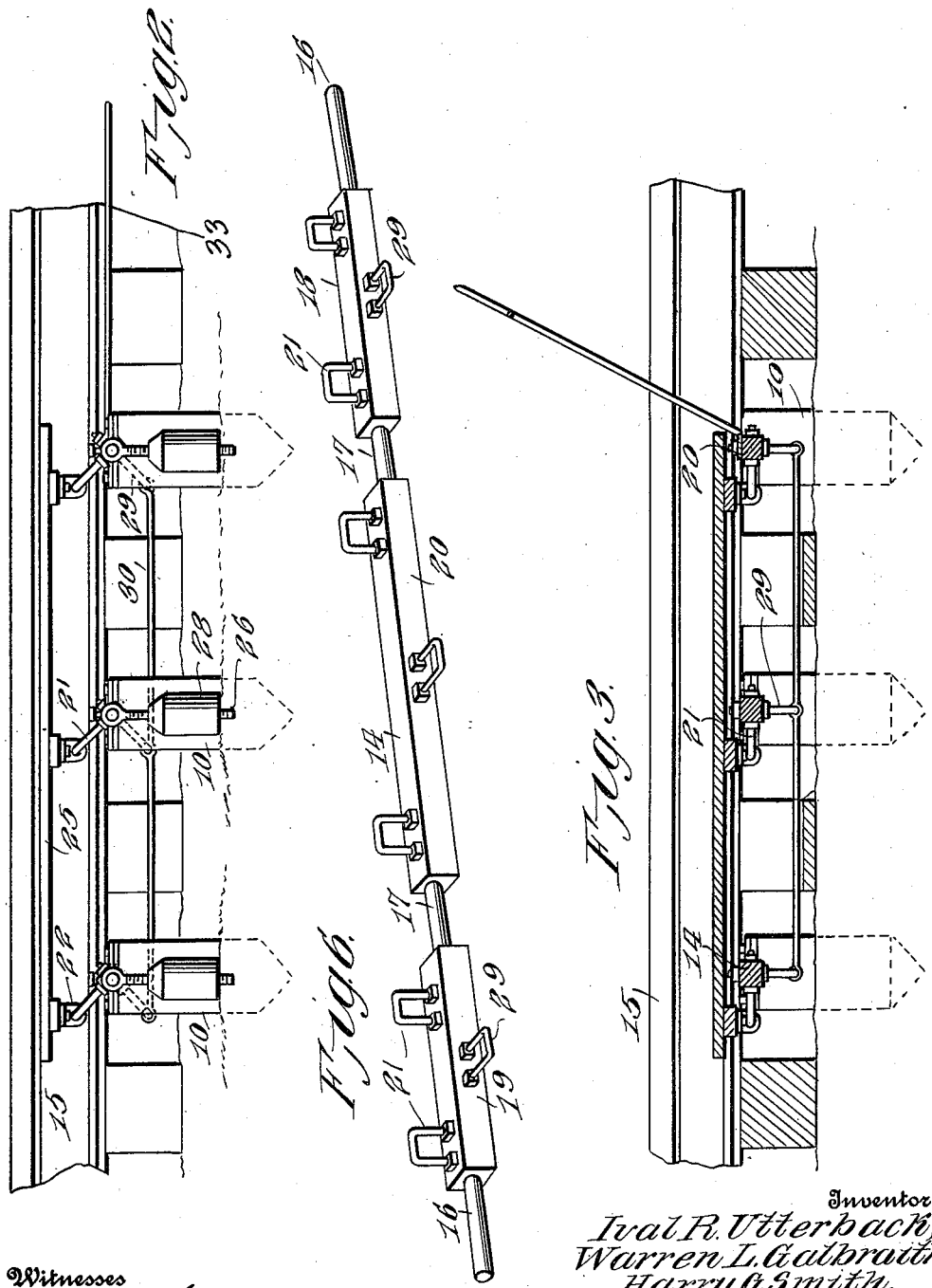

I. R. UTTERBACK, W. L. GALBRAITH & H. G. SMITH.
CATTLE GUARD.
APPLICATION FILED APR. 11, 1911.
1,008,757.
Patented Nov. 14, 1911.
3 SHEETS—SHEET 3.
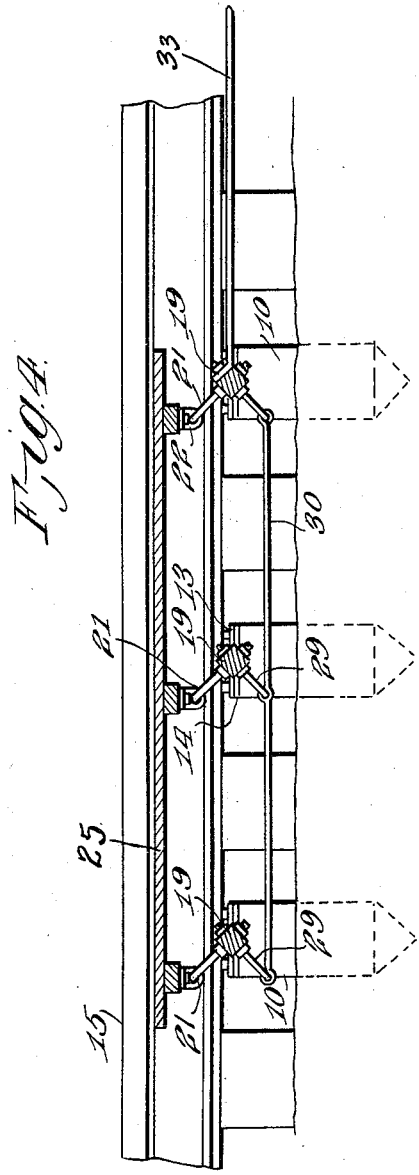
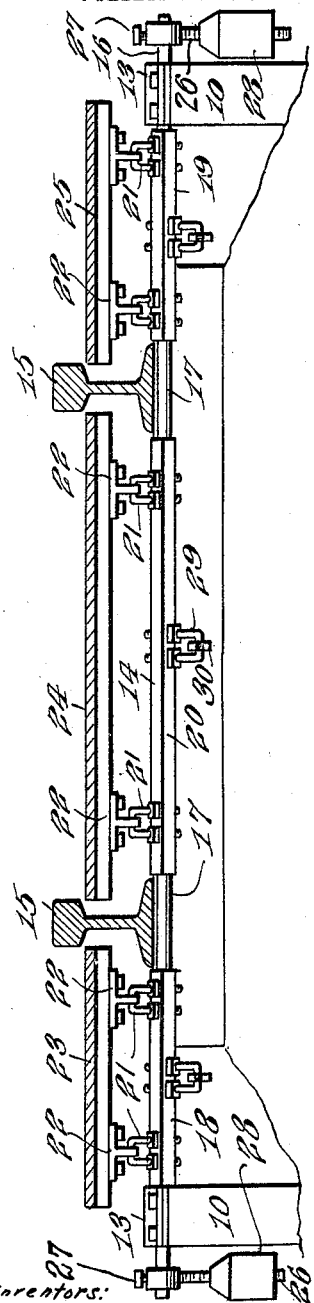
Witnesses
Frank Hough
P. A. Hosters
Inventors:
Ival R. Utterback,
Warren L. Galbraith,
Harry G. Smith,
By Victor J. Evans
Attorney

UNITED STATES PATENT OFFICE.

IVAL R. UTTERBACK, WARREN LESLIE GALBRAITH, AND HARRY G. SMITH, OF VANCOUVER, WASHINGTON.

CATTLE-GUARD.

1,008,757.  Specification of Letters Patent.  Patented Nov. 14, 1911.

Application filed April 11, 1911. Serial No. 620,302.

*To all whom it may concern:*

Be it known that we, IVAL R. UTTERBACK, WARREN L. GALBRAITH, and HARRY G. SMITH, citizens of the United States, residing at Vancouver, in the county of Clarke and State of Washington, have invented new and useful Improvements in Cattle-Guards, of which the following is a specification.

An object of the invention is to provide an efficient and reliable guard for preventing animals, such as cattle and the like, from straying along a railway.

Among other features our invention embodies a means for disposal on the bed of a railway adjacent the rails thereof, whereby when an animal strays upon a railway and contacts with our device, the weight of the animal will actuate a platform which in turn will operate a gate to move upwardly in the path of the animal, thus preventing the animal from straying farther along the railway.

For the purpose mentioned, use is made of a plurality of supporting rods extending transversely across a railway bed beneath the rails thereof, the ends of the supporting rods being journaled in suitable bearings mounted on posts, connecting rods for relatively connecting the said supporting rods, platforms hingedly supported by the said supporting rods, the said platforms being movable to actuate the supporting rods when a weight is disposed thereon, and a gate secured to one of the supporting rods and adapted to swing therewith, the said gate being movable upwardly to form a barrier when a weight is disposed on the said platform, suitable balancing means being provided on the ends of the supporting rod to normally reposition the platforms and the said gate when the weight is removed from the platforms.

The platforms of our device are positioned beneath the treads of the rails so that a train operating over the rails will not contact with the platform, the gate of our device being also normally positioned beneath the treads of the rails and movable upwardly to extend beyond the treads of the rails to form a barrier as heretofore mentioned.

Reference is to be had to the accompanying drawings constituting a part of this specification, in which similar characters of reference denote corresponding parts in all the views, and in which—

Figure 1 is a plan view of our device. Fig. 2 is a side elevation showing the gate in normal or lowered position. Fig. 3 is a longitudinal sectional view on the line 3—3 in Fig. 1 and showing the gate in final or raised position. Fig. 4 is a longitudinal sectional view on the line 4—4 in Fig. 1. Fig. 5 is a transverse sectional view on the line 5—5 in Fig. 1. Fig. 6 is a perspective view of one of the supporting rods.

Referring more particularly to the various views we employ a plurality of posts 10 mounted on both sides of a track disposed in a railway bed and journaled in bearings 13 secured to the posts 10 are supporting rods 14, the said supporting rods extending across the railway bed beneath the rails 15 of the track. The ends 16 of the supporting rods are preferably reduced in cross section and have a circular periphery so that the supporting rods can be conveniently supported in the bearings 13, as will be readily seen. Between the ends 16 of each of the supporting rods, reduced circular portions 17 are provided, the rails 15 being disposed over the mentioned circular portions 17, as shown in Fig. 5 and between the ends 16 and the circular portions 17 are formed end portions 18, 19 and a middle portion 20, the middle portion 20 being disposed between the rails 15 and the end portions 18, 19 adjacent the outer sides of the rails 15. Secured to each of the portions 18, 19, 20 are pairs of U-shaped supporting bars 21, the said bars extending upwardly at an angle from the supporting rod 14 with preferably one pair of bars 21 secured to each of the portions 18, 19 and 20.

Journaled on the bars 21 are bearings 22 secured to the under sides of platforms 23, 24 and 25, the platforms 23 and 24 being positioned adjacent the outer sides of the rails 15 and the platform 25 being positioned between the rails 15. Secured to the ends 16 of the supporting rods 14, adjacent the bearings 13 are screw rods 26 rigidly held on the end 16 by set screws 27, so that the said rods 26 will depend from the end 16, and threadedly engaging the rods are weights 28, the said weights being adjustable on the rods and adapted to position the supporting rods 14 so that the platforms 23, 24 and 25 will be held in normal position as shown in Fig. 2. Depending from each of the end portions 18, 19 and the middle portions 20 of the supporting rods 14 are hangers 29, preferably of a U-shaped construction similar to the bars 21 and journaled on the hangers are connecting rods 30, the said rods being disposed longitudinally to the rails 15 and relatively connecting the supporting rods 14 as shown in Fig. 4, the said rods being so positioned that any weight disposed on one of the platforms will operate all of the platforms simultaneously.

Rigidly connected to one of the supporting rods 14, adjacent one of the ends of each of the platforms 23, 24 and 25, are gates 31, 32, 33, the gate 31 being disposed adjacent the end of the platform 23, the gate 32 being disposed adjacent one end of the platform 24 and the gate 33 being disposed adjacent one end of the platform 25, the gate 33 being positioned between the rails 15, as disclosed in Fig. 1 and the said gates 31, 32, 33 being normally positioned to lie below the upper ends of the rails 15 so that any train operating over the rails will not be interferred with by the mentioned gates.

Now assuming that my device is in normal or initial position, when an animal, such as a cow, steps upon one of the platforms 23, 24 or 25, the weight of the animal being greater than the weights 28 will tend to move the platforms downwardly, thus actuating the supporting rods 14 and as each of the supporting rods are formed of an integral piece of material and are relatively connected by connecting rods 30, a relative movement of each of the platforms will result, owing to the weight of the animal upon one of the platforms. Thus it will be seen that the relative turning movement of the supporting rods 14 will operate the guards 31, 32 and 33 secured to one of the supporting rods 14 so that the said guards will swing upwardly and extend above the upper ends of the rails 15 to form a barrier and prevent the animal from proceeding farther along the track. When the animal steps from one of the platforms 23, 24 or 25 upon which it has been standing, the weights 28 having been swung with the supporting bars 14, will reassume a depending position and the said weights being secured to the supporting bars will relatively move the supporting bars therewith, so that the platforms 23, 24 and 25 will reassume their initial or normal position and consequently the gates or guards 31, 32 and 33 will swing downwardly below the upper ends of the rails 15 and will also assume their normal position so that a vehicle can operate over the tracks without contacting with the cattle guard.

From the foregoing description it will be readily seen that an efficient cattle guard is provided, in which the various parts are normally positioned beneath the top of the rail so that a vehicle can operate over the rails without engaging the cattle guard and the cattle guard will be at all times operable to prevent animals from straying along the railway. Although for the purpose of describing our cattle guard we have shown a particular construction, it will be understood that we do not limit ourselves thereto and the scope of the invention is defined in the appended claims.

Having thus fully described the invention, what we claim as new, is:—

1. A cattle guard comprising supporting rods mounted to extend transversely to a railway and beneath the rails thereof, the said supporting bars having reduced portions immediately beneath the rails, U-shaped bars secured to the said supporting rods and extending angularly upward therefrom, platforms journaled on the said bars, hangers secured to the said rods and depending therefrom, connecting rods journaled to the said hangers and relatively connecting the said supporting rods and a gate secured to one of the supporting rods and movable therewith, the said gate being adapted to move upwardly and provide a barrier when a weight is disposed on the said platform.

2. A cattle guard comprising supporting rods mounted to extend transversely to a railway and beneath the rails thereof, the said supporting bars having reduced portions immediately beneath the rails, U-shaped bars secured to the said supporting rods and extending angularly upward therefrom, platforms journaled on the said bars, hangers secured to the said rods and depending therefrom, connecting rods journaled to the said hangers and relatively connecting the said supporting rods, a gate secured to one of the supporting rods and movable therewith, the said gate being adapted to move upwardly and provide a barrier when a weight is disposed on the said platform, and a plurality of weights secured to the said supporting rods and movable therewith, the said weights being adapted to operate the supporting rods to normally reposition the said platforms and the said gate when the first mentioned weight is removed from the said platforms.

3. A cattle guard comprising a plurality of supporting rods extending transversely to a track and journaled on posts disposed on both sides of the track, platforms journaled to the said supporting rods, gates connected to one of the said supporting rods, the said gates being adapted to move upwardly when the said platforms move downwardly by a weight disposed on the platforms, connecting rods for relatively connecting the said supporting rods and adjustable means secured to the ends of the said supporting rods and adapted to normally reposition the said platforms and said gates when the weight is removed from the platforms.

In testimony whereof we affix our signatures in presence of two witnesses.

IVAL R. UTTERBACK,
WARREN LESLIE GALBRAITH.
HARRY G. SMITH.

Witnesses:
P. M. ELWELL,
FRANK E. HODGKIN.